US 6,609,472 B2

(12) United States Patent
Burg

(10) Patent No.: US 6,609,472 B2
(45) Date of Patent: Aug. 26, 2003

(54) STABLE EFFICIENT AIR LUBRICATED SHIP

(75) Inventor: Donald E. Burg, Miami, FL (US)

(73) Assignee: Paulette Renee Burg, Miami, FL (US)

( * ) Notice: Subject to any disclaimer, the term of this patent is extended or adjusted under 35 U.S.C. 154(b) by 0 days.

(21) Appl. No.: 09/928,842

(22) Filed: Aug. 13, 2001

(65) Prior Publication Data

US 2002/0017228 A1 Feb. 14, 2002

Related U.S. Application Data

(63) Continuation-in-part of application No. 09/800,298, filed on Mar. 5, 2001, and a continuation-in-part of application No. 09/790,086, filed on Feb. 21, 2001, and a continuation-in-part of application No. 09/412,234, filed on Oct. 4, 1999, now abandoned, and a continuation-in-part of application No. 09/388,277, filed on Sep. 1, 1999, now abandoned.

(51) Int. Cl.$^7$ .................................. B63B 1/34
(52) U.S. Cl. .................... 114/67 A; 114/61.1; 114/280; 114/291
(58) Field of Search ............................. 114/291, 67 A, 114/278, 280–283, 61.1, 61.12–61.19; 180/116–130

(56) References Cited

U.S. PATENT DOCUMENTS

| | | | | |
|---|---|---|---|---|
| 1,412,848 A | * | 4/1922 | Dunajeff | 114/289 |
| 2,005,473 A | * | 6/1935 | Sanden | 440/44 |
| 3,261,420 A | * | 7/1966 | Schmidt | 180/122 |
| 3,590,762 A | * | 7/1971 | Yuan | 114/275 |
| 3,827,388 A | * | 8/1974 | Fulton | 440/44 |
| 3,871,317 A | * | 3/1975 | Szpytman | 114/282 |
| 3,968,762 A | * | 7/1976 | Meyer, Jr. | 114/278 |
| 4,166,515 A | * | 9/1979 | Tattersall | 180/119 |
| 4,345,538 A | * | 8/1982 | Warner et al. | 114/274 |
| 4,660,492 A | * | 4/1987 | Schlichthorst et al. | 114/67 A |
| 5,339,761 A | * | 8/1994 | Huang | 114/274 |
| 5,626,669 A | * | 5/1997 | Burg | 114/67 A |
| 5,860,383 A | * | 1/1999 | Whitener | 114/271 |

* cited by examiner

Primary Examiner—S. Joseph Morano
Assistant Examiner—Ajay Vasudeva

(57) ABSTRACT

Presented is an air lubricated ship that offers improved efficiency and stability over the prior art. Features of the preferred embodiment of the invention include: 1) a submerged bow that is generally proximal in depth to the stem, 2) a hydrofoil at the bow that not only adds stability but also allows the pressurized air layer(s) to extend further forward under the hull thereby reducing wetted area friction, 3) use of more than one air layer in series which is generally accomplished by water deflecting steps at the air layers forward portions, 4) special positioning of propulsors so that they do not interfere with the air layer(s) by aspirating pressurized air from the air layer(s), 5) optional outrigger hulls to aid to stability and to also increase useful deck area, and 6) optional configurations that allow for use of more than one air lubricated hull where such hulls are connected by structure in catamaran or other arrangements.

69 Claims, 8 Drawing Sheets

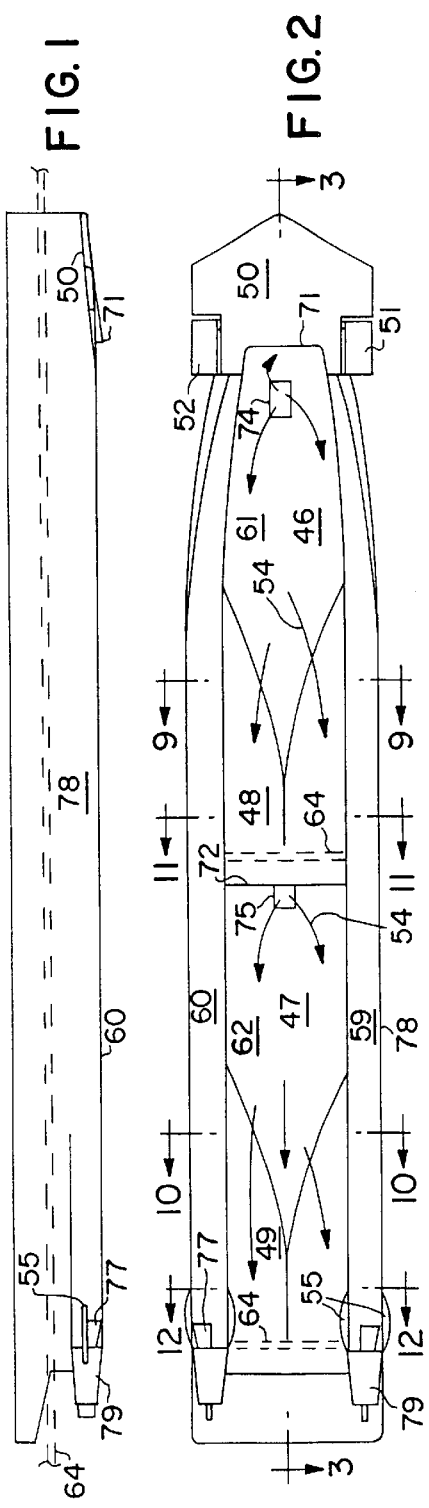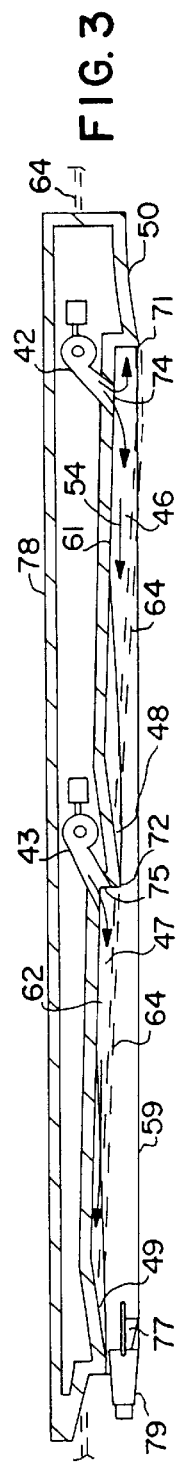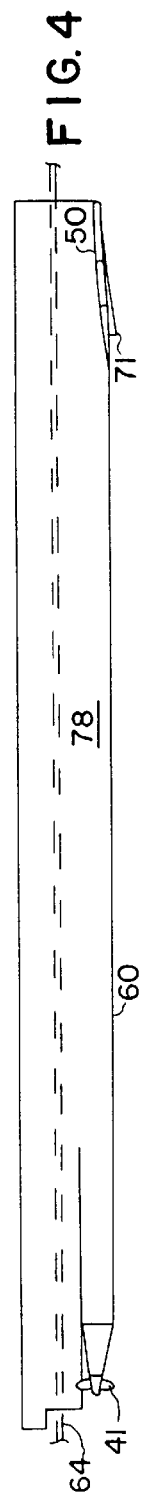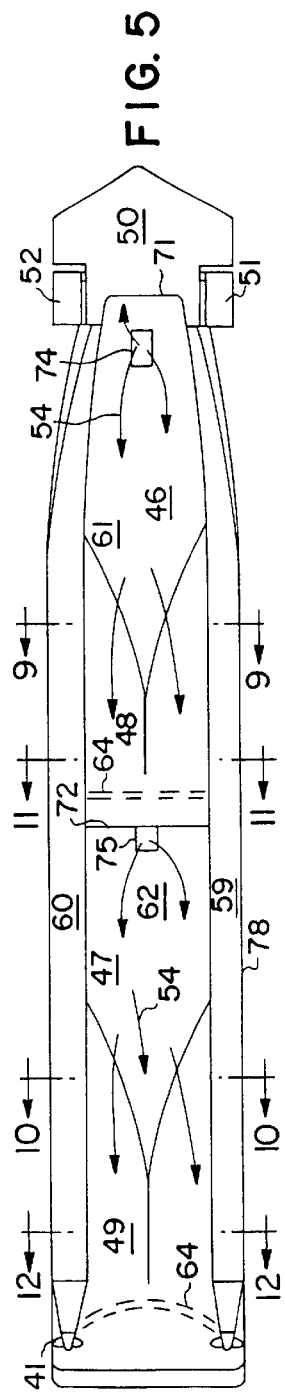

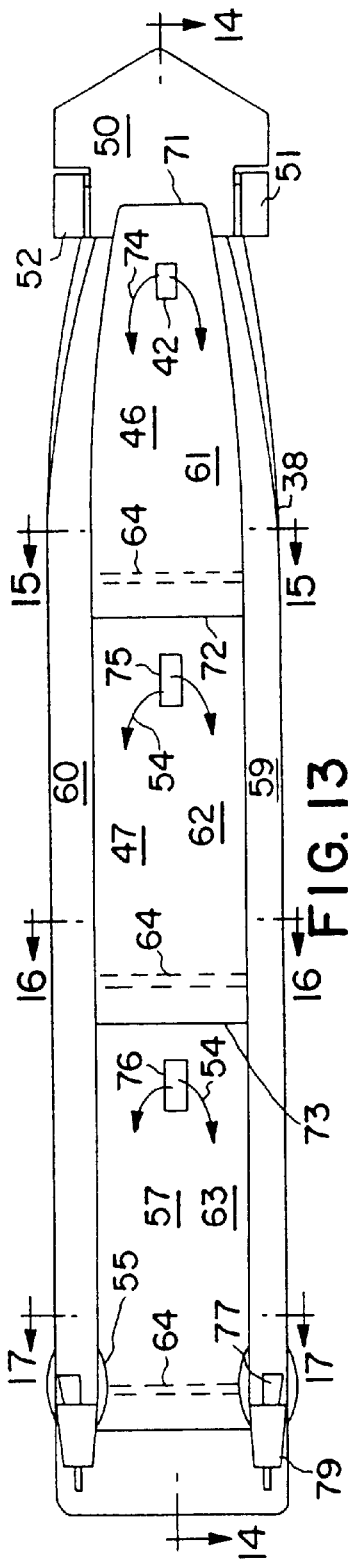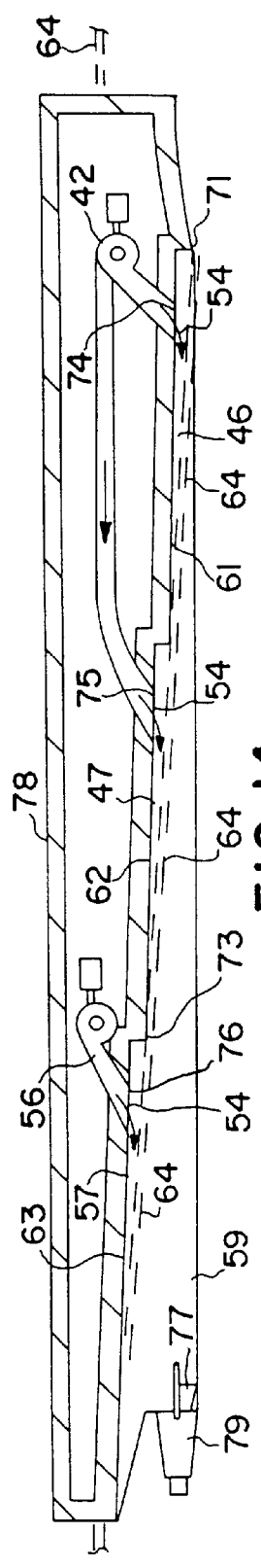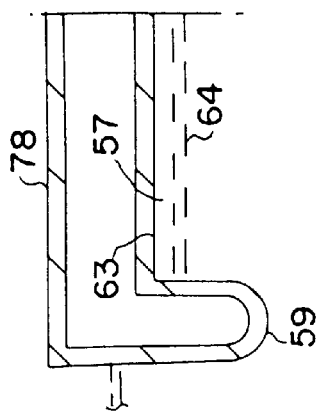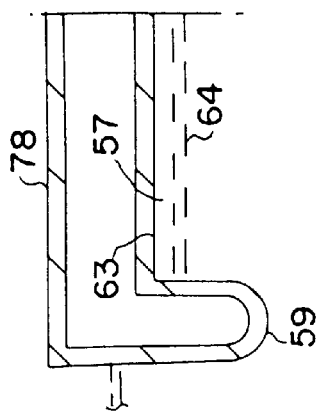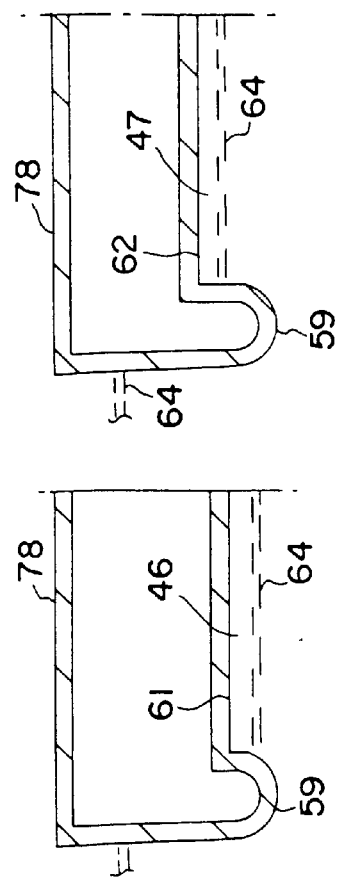

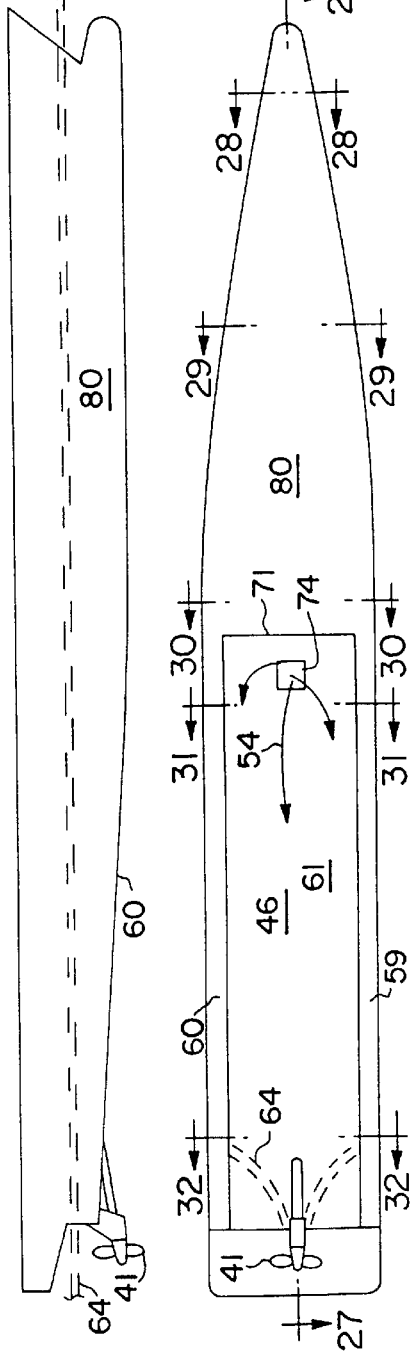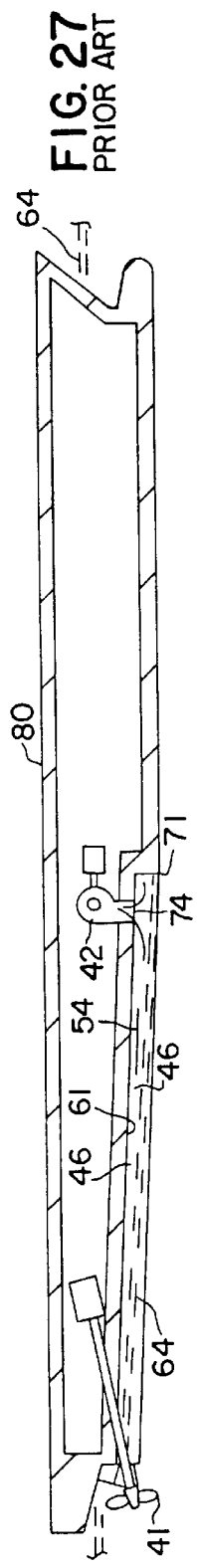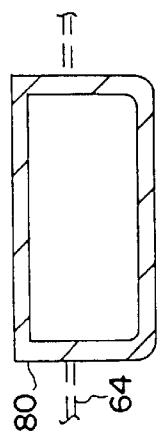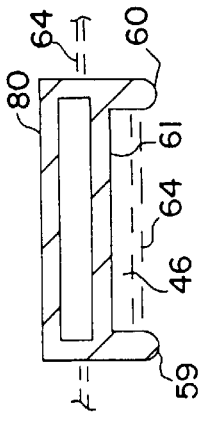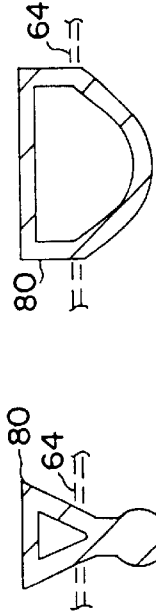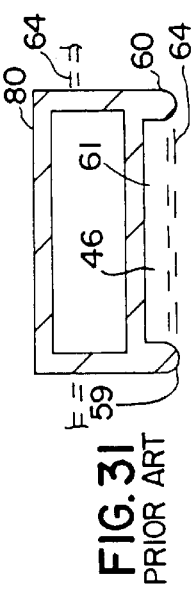

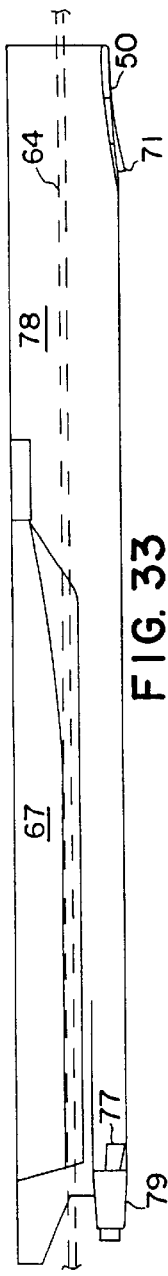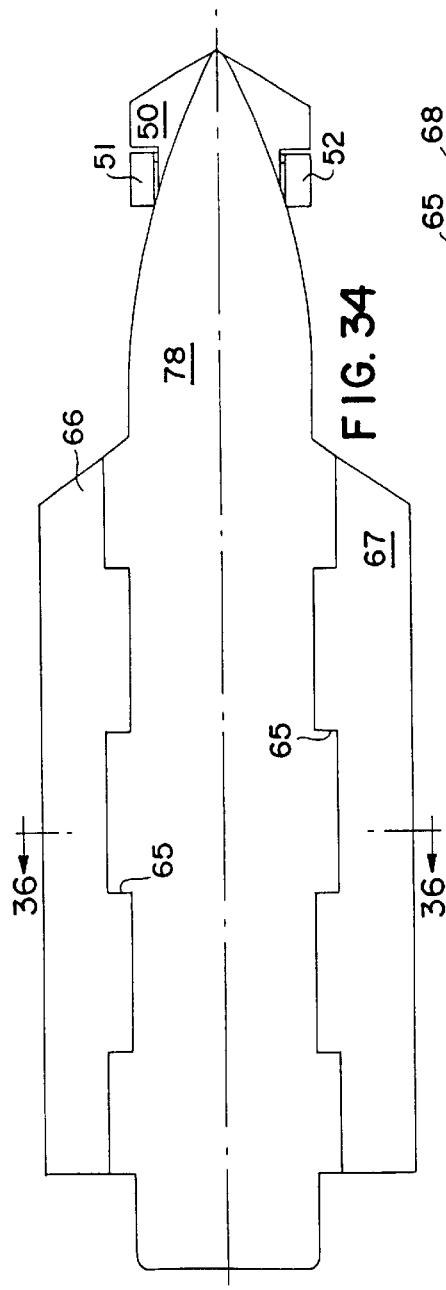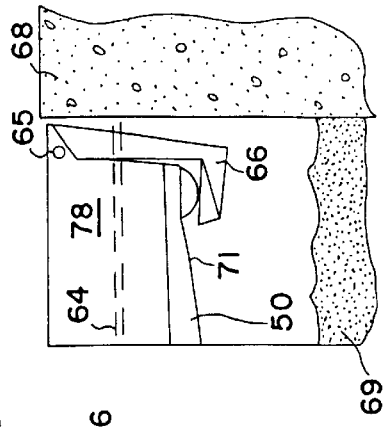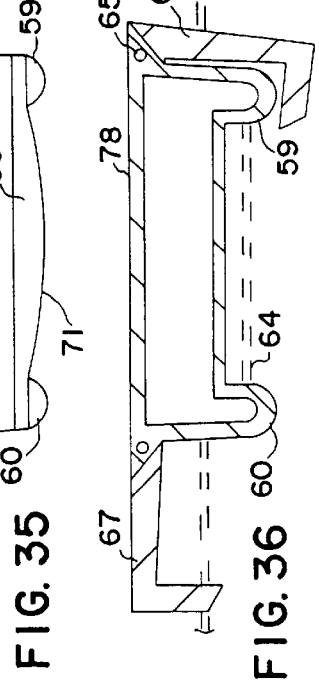

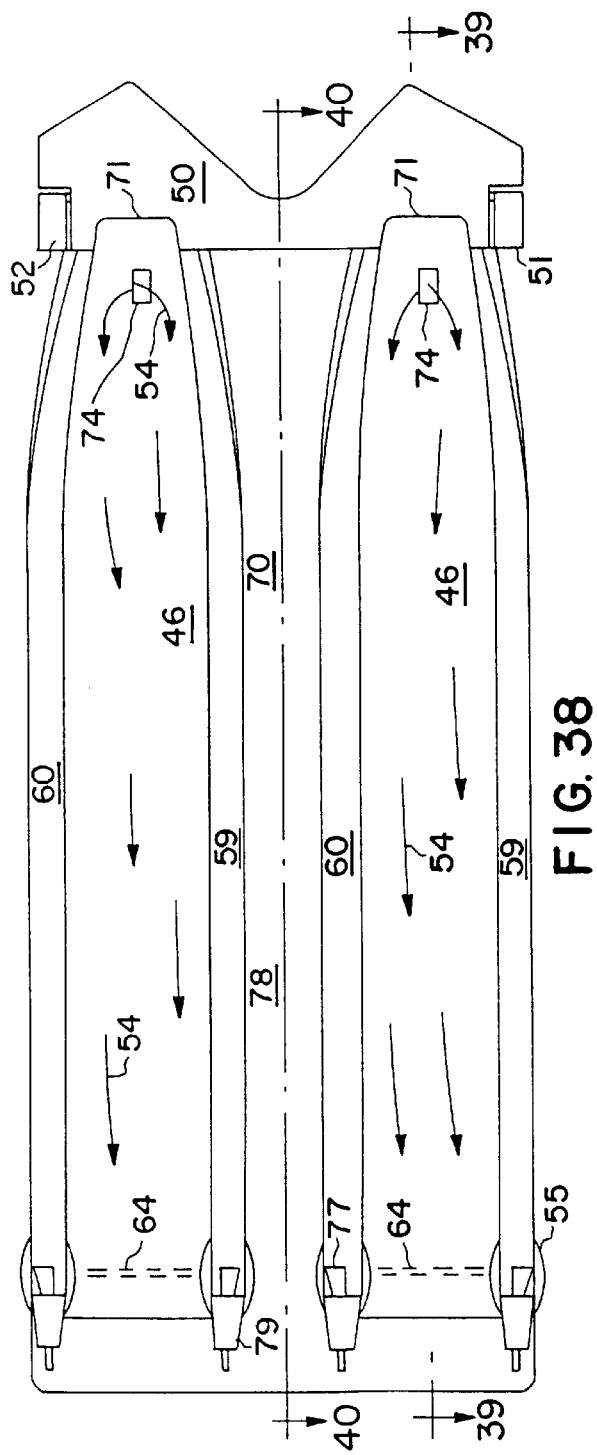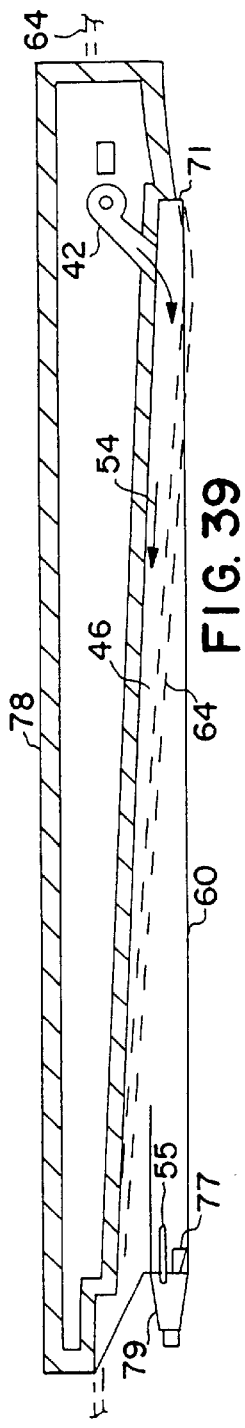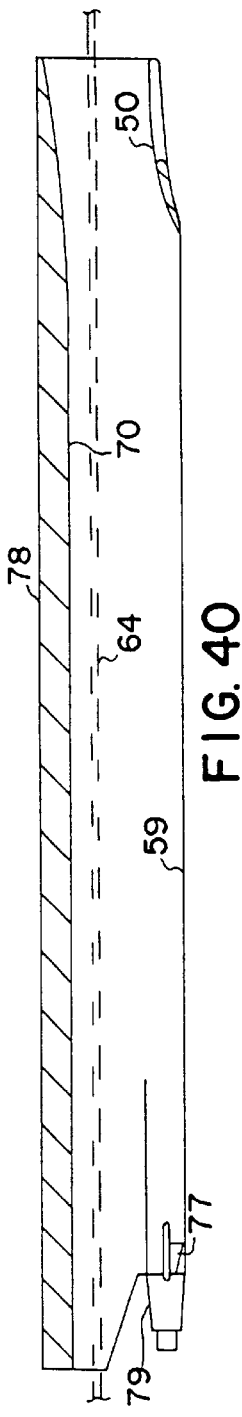

STABLE EFFICIENT AIR LUBRICATED SHIP

CROSS REFERENCE TO OTHER APPLICATIONS

This application is a continuation-in-part to U.S. applications Ser. No. 09/388,277 filed Sep. 1, 1999 now abandoned; Ser. No. 09/412,234 filed Oct. 4, 1999 now abandoned; Ser. No. 09/790,086 filed Feb. 21, 2001; and Ser. No. 09/800,298 filed Mar. 5, 2001.

FIELD OF THE INVENTION

This invention relates to the field of air lubricated boat or ship hulls used as means to increase the efficiencies of such hulls and to their propulsion and stabilization systems.

BACKGROUND OF THE INVENTION

The idea of placing a layer of air between the underside of a ship's hull and its supporting water surface has been around for many years. The Russians have reported some success with this concept. FIGS. 25 through 32 of this application show some of the more recent thinking along the line for Air Lubricated Ship designs. These are normally referred to in the specifications herein as the ALS.

Further, applicant has realized some commercial success with his pressurized air supported boat designs. One of these is illustrated in U.S. Pat. No. 5,839,384. That patent illustrates a boat hull where the bow of the boat operates proximal the water surface. The pressurized air cushion in a cavity built into an underside of the boat's hull depresses the water surface going from the bow to the stern such that the stern is lower than the bow. The pressure in the air cushion is essentially constant over the entire area of the air cushion. Air cushioned boats of this general type are commonly known as Surface Effect Craft, or simply SES's, since they work on the water's surface.

There is a major difference between the ALS and the SES concepts. The forward portion of the ALS is below the water surface and creates a hole in the water. Proper location of a step in the hull and shaping of the aft sections of the hull of the ALS form a cavity when the ALS is moving forward. This effect can be realized by viewing the rising of the water behind a planing boat's hull until it reaches sea level.

An example of current thinking in ALS hull design can be seen in FIGS. 27 and 31 and 32 of this application. Blower pressurized air is supplied to the cavity formed behind the step in the hull thereby creating a pressurized air layer between portions of the bottom of the ship and the supporting water surface. This, of course, reduces wetted area friction of the hull. It is to be noted that the air cavity rises going from aft of the step rearward until the water surface again contacts the hull. Efficiency gains for the ALS compared to a conventional hull are claimed to be in the twenty-percent area. Power to run the blower is very small with a rough estimate as five percent or less of propulsive power claimed.

By contrast, the SES is more of a surface-skimmer type vessel whereby a blower-pressurized air cushion disposed below the SES's hull supports a majority, normally about eighty percent, of vessel weight. The SES's bow is located proximal the water surface and the effect of the pressure in the air cushion is to depress the water level going from bow to stern. This makes for a very efficient vessel that requires only about half of the propulsive power of a comparable monohull or catamaran at high speeds. However, as size and weight of the SES increase the percentage of total power required to run the blower(s) increases rather dramatically. Roughly speaking, blower power requirements, given as a percentage of the propulsive power requirements, range from about ten percent for a 100 foot (30-meter) SES to more than fifty percent for a 656 foot (200-meter) SES. Larger size SES's have greater proportional blower power requirements. As a point to consider, a 100-foot (30-meter) SES would normally depress the water going from bow to stern by about two feet (0.61 meter) while a 656 foot (200-meter) SES would depress the water going from bow to stern by about 16 feet. That is eight times as much for the large SES.

In rough comparison: 1) The ALS gives about a twenty percent reduction in propulsive power requirements and needs about an additional five or less percent power for its blowers and 2) The SES generally gives about a fifty percent reduction in propulsive power requirements but needs from ten to over fifty percent additional power for its blowers. The SES clearly wins the overall efficiency battle for smaller sizes—say up to 350 feet (107 meters) or so. The ALS comes into primary contention for large hulls where its need for blower power of only about five or less percent of the value of its propulsive power overcomes its lower hull efficiency. A heavily loaded 656-foot (200-meter) SES would normally require on the order of fifty percent of its propulsive power to drive its blowers.

This instant application presents significant improvements to ALS technology as applied to all type and sizes of boats and ships but is primarily directed toward large ships. Some areas of advancement to the ALS concept offered by the instant invention include: 1) Means to extend the ALS's air cavity further forward, sometimes with multiple air cavities, and thereby further reduce hull wetted area friction, 2) Hydrofoil(s) disposed forward in the ALS's hull to both increase hull stability and to provide means to extend the air cushion further forward in the ALS's hull, 3) Propulsion systems particularly conceived and disposed to maximum their efficiency in ALS's, and 4) Means to stabilize the ALS by addition of outrigger hulls. The instant invention presents both single and multiple ALS hull configurations.

The instant invention offers advancements over applicant's earlier inventions as well as over the prior art. These advancements are discussed in some detail in the following sections.

Szpytman, U.S. Pat. No. 3,871,317; Dunajeff, U.S. Pat. No. 1,412,846; Meyer, Jr., U.S. Pat. No. 3,968,762; Tattersall, U.S. Pat. No. 4,166,515; Huang, U.S. Pat. No. 5,339,761; and Schlichthorst et al, U.S. Pat. No. 4,660,492 all present partially air cushion supported marine craft that also have hydrofoils. As air cushioned craft that utilize pressurized air to depress the water surface below their air cushions as seen going from the bow to the stern, these craft are known as Surface Effect Ships (SESs). None of these craft have hydrofoil members that emanate from either side of a lower part of the forward bow portion to thus form an enlarged substantially horizontal surface on the underside of the forward bow portion as compared to bow sections proximal to and above the hydrofoil as does the instant invention. The aforementioned substantially horizontal and wide under surface at the bow that is formed by the design and placement of the bow hydrofoil provides good ride qualities since the bow is deeply submerged and also provides a wide substantially horizontal surface that allows starting an air cushion proximal the bow. It is further to be noted that all of the aforementioned U.S. Patents are SES type pressurized air cushion designs that have their bows at or very close to the water surface. The pressure of the blower supplied air depresses the water surface going from forward to aft so that the water surface is substantially lower at the stern than at the bow. The instant invention is a true Air Lubricated Ship (ALS) since its bow is deeply submerged to actually dig a deep hole in the water. The water leaving the bow at the step that starts the air cushion(s) rises going aft. While not quite as efficient as a pure SES, the advantage of the instant invention's ALS concept is that a much lesser amount of blower pressurized air and hence blower power is required to supply the air layer(s).

SUMMARY OF THE INVENTION

The primary object of the instant invention is to offer a notable improvement in ALS efficiency by extending the pressurized air lubrication layer(s) further forward in the ALS's hull.

A related object of the invention is that the air or gas layers be pressurized by artificial means.

A directly related object of the invention is to provide a hydrofoil forward on the ALS that, due to its widening effect on lower portions of the ALS's hull, allows a step that defines the forward end of the first air lubrication layer to be moved further forward.

It is a related object of the invention that the a step be positioned at a forward portion of the air layer(s) to direct water away from the ALS's hull aft of said step.

It is another related object of the invention that a lower surface proximal to and forward of said step(s) turn downward to direct water flow downward when the improved air lubricated ship is moving forward.

It is a further related object of the invention that said pressurized air or gas layer(s), on average, slop upward aft of step(s).

Yet another object of the invention is that the hydrofoil include flap-like members that aid in controlling pitch and roll of said ALS.

It is a further object of the invention that an underwater section of the improved ALS's hull, as seen in a horizontal plane taken above the hydrofoil when the improved air lubricated ship is moving forward, is at least partially air foil shaped over its forward portion to thereby reduce drag of the hull.

It is a yet another object of the invention that a lowermost submerged portion of the ALS proximal a bow of the ALS be within twenty percent of the submerged depth of a lowermost portion proximal of an aft portion of said improved ALS when the ALS is moving forward in a calm sea.

It is another object of the invention that a lowermost submerged portion of the ALS proximal a bow of the ALS be within twenty-five percent of the submerged depth of a lowermost portion proximal of an aft portion of said improved ALS when the ALS is moving forward in a calm sea.

It is a further object of the invention that a lowermost submerged portion of the ALS proximal a bow of the ALS be within thirty percent of the submerged depth of a lowermost portion proximal of an aft portion of said improved ALS when the ALS is moving forward in a calm sea.

It is a yet a further object of the invention that a lowermost submerged portion of the ALS proximal a bow of the ALS be within thirty-five percent of the submerged depth of a lowermost portion proximal of an aft portion of said improved ALS when the ALS is moving forward in a calm sea.

It is still another object of the invention that a first step forward of a first gas layer be disposed, at least in its majority, in a forward fifteen percent of a length of said improved ALS.

It is yet another object of the invention that a first step forward of a first gas layer be disposed, at least in its majority, in a forward twenty percent of a length of said improved ALS.

It is a further object of the invention that a first step forward of a first gas layer be disposed, at least in its majority, in a forward twenty-five percent of a length of said improved ALS.

It is still another object of the invention that a first step forward of a first gas layer be disposed, at least in its majority, in a forward thirty percent of a length of said improved ALS.

It is a further object of the invention that the first gas layer be bordered over at least a majority of its length by sidekeels.

It yet another object of the invention that it further includes a second step in the underside of said ALS wherein said second step is disposed, at least in its majority, proximal an aft end of said first pressurized gas layer and wherein a second pressurized gas layer is disposed, at least in its majority, aft of said second step.

It is a directly related object of the invention that said second pressurized gas layer, on average, slopes upward going from forward to aft.

It is yet another object of the invention that the second gas layer be bordered over at least a majority of its length by sidekeels.

It is a further object of the invention it may also include a third step in the underside of the ALS wherein said third step is disposed, at least in its majority, proximal an aft end of said second pressurized gas layer and where a third pressurized gas layer is disposed, at least in its majority, aft of said third step.

It is a related object of the invention that the third pressurized gas layer, on average, slopes upward going from forward to aft.

It is a further related object of the invention that the third gas layer may be bordered over at least a majority of its length by sidekeels.

It is a related object of the invention that the external surfaces of sidekeels bordering any or all of the gas layers, as seen in a vertical transverse plane of the ALS, may be curvilinear over a majority of their lower surfaces.

It is a directly related object of the invention that the external surfaces of the sidekeels bordering any or all of the gas layers, as seen in a vertical transverse plane of the ALS, may be of circular arc sections over a majority of their lower surfaces.

It is yet another object of the invention that sidekeels bordering one or more gas layers may be continuous on either side of the gas layers.

It is a further object of the invention that separate artificial gas pressurization means may be used to pressurize any of the gas layers.

It is an optional object of the invention that the same artificial gas pressurization means may be used to pressurize two or more gas layers.

It is a further optional object of the invention that downward extending gas restraining seal(s) may be placed proximal an aft end of one or more of the gas layer(s).

It is a directly related object of the invention that said downward extending gas restraining seal(s), as seen in vertical transverse plane(s) of the instant invention ALS, can be angled to horizontal over a majority of their width.

It is a further object of the invention that outrigger hulls can be disposed either side of a main hull of said air lubricated ship.

It is a directly related object of the invention that said outrigger hulls can be retractable.

It is another directly related object of the invention that said outrigger hulls can be retractable downward such that a portion of at least one of the outrigger hulls is disposed below one of the sidekeels of said improved air lubricated ship.

It is yet another object of the invention that propulsors are preferably disposed proximal an aft end of said sidekeels.

It is a related object of the invention that the propulsors are waterjets that take in inlet water from a portion of a periphery of said sidekeels.

It is a further related object of the invention that one or more air fences can be disposed above and proximal to water inlets of said waterjets whereby said air fences restrict air from flowing downward into the waterjet's water inlets.

It is a further optional object of the invention that said propulsors can be propellers with said propellers rotating, as seen in an aft view of the improved air lubricated ship, with an upper blade rotating in an outboard direction to thereby aid in restricting gas leakage from an aft gas layer by building up a pressure front of water over an aft end of said aft gas layer.

It is a further optional object of the instant invention that multiple hull ALSs to the instant invention configuration be offered.

BRIEF DESCRIPTION OF THE DRAWINGS

FIG. 1 presents a side or profile view of a preferred embodiment of the instant invention ALS. This variant has waterjet propulsors and a hydrofoil forward. Note that the bow is rather deeply submerged and at a similar draft as the aft portions.

FIG. 2 is a bottom plan view of the ALS of FIG. 1. A first and a second air or gas layer with each having an aft seal are shown here.

FIG. 3 is a centerline cross-sectional view, as taken through line 3—3 of FIG. 2, that shows the rising, from forward to aft, first and second pressurized gas layers.

FIG. 4 is a similar profile view as given in FIG. 1 but in this case the propulsors are propellers.

FIG. 5 presents a bottom plan view of the instant invention shown in FIG. 4.

FIG. 13 presents a similar bottom plan view as presented in FIG. 2 but in this case there are three gas layers and no downward extending gas seals. It is important to note that the instant invention can function with from as little as one to numerous gas layers. The showing of two and three gas layers in the figures is for illustration purposes only.

FIG. 14 presents a centerline cross-sectional view, as taken through line 14—14 of FIG. 13.

FIG. 15 is a half-breadth cross-section, as taken through line 15—15 of FIG. 13.

FIG. 16 is a half-breadth cross-section, as taken through line 16—16 of FIG. 13.

FIG. 17 is a half-breadth cross-section, as taken through line 17—17 of FIG. 13. Note the difference in the rising elevations of the gas layers in FIGS. 15, 16, and 17.

FIG. 25 presents a profile view of a prior art ALS. This shows a standard underwater propeller, a bulb bow, and upward tapering sidekeels.

FIG. 26 is a bottom plan view of the prior art ALS of FIG. 25. Note the absence of a hydrofoil forward and, also important, the fact that the first and only gas layer starts near mid-ship. The gas layer must of necessity start well aft compared to the instant invention ALS since the bow portions are bulb shaped and/or curvilinear and then, after some distance, transition to the required flatter undersides required at the forward end of the gas layer.

FIG. 27 is a cross-sectional view, as taken through line 27—27 of FIG. 26, of the prior art ALS. Note the use of a propeller directly aft of the gas layer. This location of the propeller(s) directly aft of the gas layer results in: 1) Gas escaping from the gas layer adversely effecting the propeller's operation and 2) The propeller accelerating gas out of the aft end of the gas layer thereby causing a loss of gas cushion size and/or pressure.

FIG. 28 presents a transverse cross-section, as taken through line 28—28 of FIG. 26, that shows the extreme curvilinear shape of the prior art ALS hull forward.

FIG. 29 shows a transverse cross-section, as taken through line 29—29 of FIG. 26, that shows the still curvilinear shape of the prior art ALS hull as it goes rearward from the bow.

FIG. 30 presents a transverse cross-section, as taken through line 30—30 of FIG. 26, that shows the flatter underside of the prior art ALS just upstream of the gas layer.

FIG. 31 gives a transverse cross-section, as taken through line 31—31 of FIG. 26, that shows the prior art ALS hull and gas layer shapes forward in the gas layer.

FIG. 32 presents a transverse cross-section, as taken though line 32—32 of FIG. 26, that depicts the prior art ALS hull and gas layer shapes proximal an aft portion of the gas layer. Note the higher level of the gas layer here as it is rising.

FIG. 33 is a profile view of the same instant invention ALS as given in FIG. 1 but with the addition of stabilizing sidehulls.

FIG. 34 is a topside plan view of the outrigger hull equipped instant invention ALS presented in FIG. 33.

FIG. 35 gives a bow view of the outrigger hull equipped instant invention ALS presented in FIGS. 33 and 34. Note that the outrigger hull would normally be much closer to the water surface than the main hull to reduce drag of the stabilizing outrigger hulls.

FIG. 36 presents a cross-section, as taken through line 36—36 of FIG. 34. Note that the port side outrigger hull is retracted downward here for illustration purposes.

FIG. 37 gives a half-breadth bow view of the instant invention ALS as it would be docked to a pier with its port side sidehull retracted downward.

FIG. 38 presents a bottom plan view of an instant invention ALS in a multiple-hull configuration. The outboard profile view of this multiple hull ALS is the same as FIG. 1. In addition to the use of two instant invention ALS hulls in a multiple hull configuration, note that there is only a single gas layer shown here. This was done for illustrative purposes to show how a single gas layer would be configured in an instant invention ALS. Note where the gas layer reattaches to the hull between the waterjet propulsors as is shown by the dashed waterline.

FIG. 39 is a cross-sectional view, as taken through line 39—39 of FIG. 38, that shows the single gas layer depicted here.

FIG. 40 presents a centerline cross-sectional view, as taken through line 40—40 of FIG. 38, that shows the cross-deck structure that connects the two ALS hulls in this multi-hull arrangement. Note that while the single hull arrangement as earlier presented herein is normally preferred that the instant invention ALS hulls can be arranged in catamaran configuration, as shown here, or even in excess of two hull arrangements.

DETAILED DESCRIPTION

Figure 6:
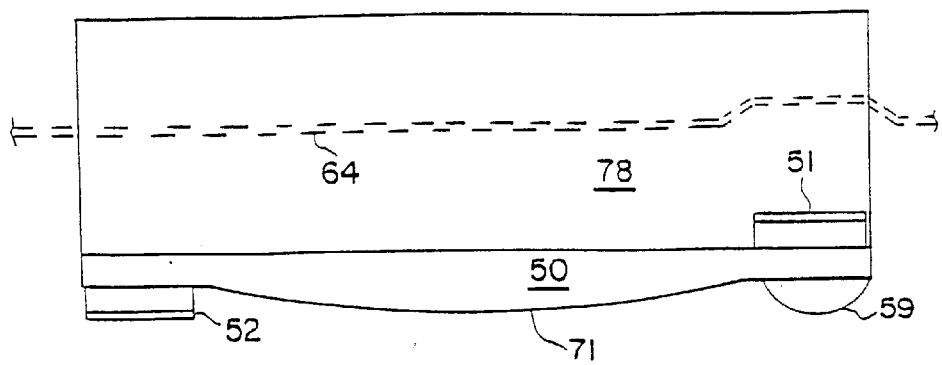
FIG. 6 gives a bow view of the instant ALS invention showing the bow hydrofoil. Note that a port trim flap is up and a starboard trim flap is down in this illustration. This orientation of the trim flaps would help prevent a roll to starboard.

FIG. 1 presents a side or profile view of a preferred embodiment of the instant invention air lubricated ship (ALS) 78. Shown are a hydrofoil 50 forward, waterjet propulsor 79, waterjet inlet 77, waterjet air fence 55, starboard sidekeel 60, and waterline 64. The waterline is shown for when the ALS 78 is traveling forward in a calm sea.

FIG. 2 is a bottom plan view of the instant invention ALS 78. Shown are hydrofoil trim control flap-like members 51, 51, first air or gas layer 46, first gas layer step 71, first gas layer cavity 61, first pressurized gas inlet 42, gas flow arrows 54, and first gas layer aft seal 48. Also shown are an optional second gas layer 47, second gas layer step 72, second gas layer cavity 62, second pressurized gas inlet 43, and second gas layer aft seal 49. Also shown is a port sidekeel 59. Note the waterlines 64 on the first and second gas layer aft seals 48, 49 as these waterlines represent the reattachment of the water to the underside of the hull at the aft end of the first and second gas layers 46, 47.

It is important to realize from FIGS. 1 and 2 that the benefits of this unique instant invention hydrofoil arrangement are severalfold. This hydrofoil arrangement provides: 1) A wide underside base so that the first gas layer cavity 61, and hence the first gas layer 46, can be extended far forward in the hull thereby greatly reducing wetted area friction drag compared to prior art ALS technology, 2) Significant lift to the forward end of the hull, 3) Extreme stability in heavy seas, and 4) Roll and pitch control when the optional port and starboard flap-like members are employed to act as ride control mechanisms.

FIG. 3 presents a centerline cross-sectional view, as taken through line 3—3 of FIG. 2, that shows a rising waterline 37, going from forward to aft, under both the first and second gas layers. When moving forward, the bow or forward portion of the instant invention ALS 78 has created a hole in the water that the first gas layer 46 simply fills in aft of the first gas layer step 71. The first gas layer 46 is pressurized by blower 42 and the second gas layer 47, formed by second gas layer step 72, is pressurized by second gas layer blower 43. It is important to note the rising waterline 37 under the gas layer(s) here. While preferable to have two or more gas layers as that approach extends the effective overall length of the gas layer(s) in total, it is not necessary to have more than one gas layer to have the instant invention ALS 78 be effective. While the preferred embodiment of the instant invention ALS 78 shows separate pressurizing blowers for each gas layer that is not necessary. One blower can be utilized to pressurize two or more gas layers so long as some compensation is made for the fact that each succeeding gas layer, due to its shallower depth, normally functions at a slightly lower pressure than its predecessor.

FIG. 4 presents a similar profile view of a version of the instant invention ALS 78 as given in FIG. 1 but in this instance propelled by a propeller(s) 41.

FIG. 5 is bottom plan view of the instant invention ALS 78 having propeller drives 41 as was presented in FIG. 4 in a profile view.

FIG. 6 a bow view of the instant invention ALS 78 showing the hydrofoil 50, hydrofoil port trim-flap 51 and hydrofoil starboard trim-flap 52. In this example, the port trim-flap 51 is up and the starboard trim-flap 52 is down to correct a roll moment to starboard. Note the rising of the waterline 64 above the port trim-flap 51.

Figure 7:
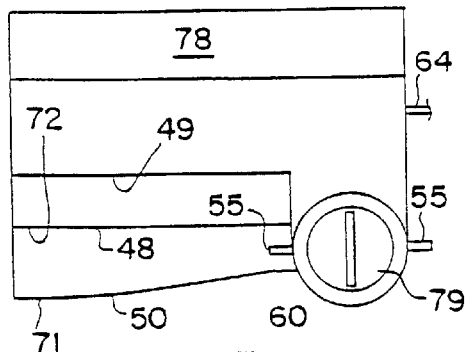
FIG. 7 is a half-breadth stern view of the waterjet propelled instant invention presented in FIGS. 1, 2, and 3.

FIG. 7 gives a half-breath starboard side stern view of the instant invention ALS 78 presented in FIGS. 1 and 2. Note the waterjet propulsor 79 and its air fences 55. The air fences 55 help to keep surface air from entering the waterjet's inlets.

Figure 8:
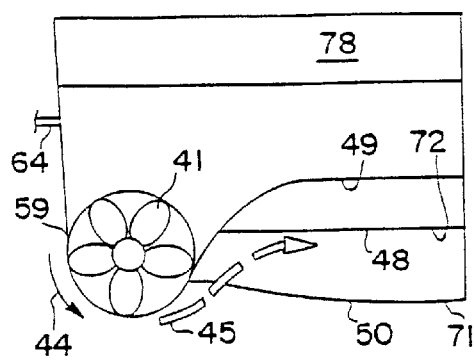
FIG. 8 gives a half-breadth stern view of the propeller propelled instant invention shown in FIGS. 4 and 5.

FIG. 8 shows a half-breath port side stern view of the instant invention ALS 78 presented in FIGS. 4 and 5. This shows a propeller 41 that is mounted on an aft end of the port sidekeel 59. The direction of rotation of the propeller 41 is shown by rotation arrow 44. This is normally termed an outboard-rotating propeller.

Water flow arrow 45 shows some of the water coming off of the propeller 41 is directed against the second gas layer aft seal 49 here which helps to reduce the amount of gas leakage from the gas layer. The effect of this can be realized by referring back to FIG. 5 where the waterline 64 at the aft end of the second gas layer 47 can be seen as reattaching to the underside of the second gas layer seal 49 in a forward curving pattern because of the effect of the inboard directed propeller wash.

Figure 9:
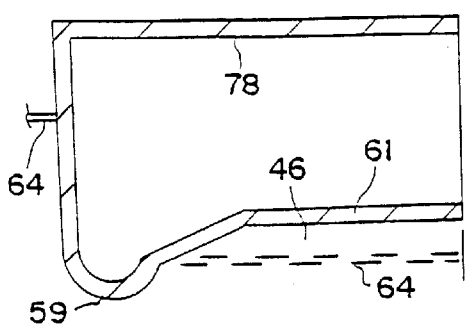
FIG. 9 present a half-breadth cross-section, as taken through line 9—9 of FIG. 2, that shows the first gas layer.

FIG. 9 presents a half-breadth cross-section, as taken through line 9—9 of FIGS. 2 and 5, that shows the first gas layer 46 proximal the beginning of the first gas layer aft seal 61. The preferred, at least in part, curvilinear lower portion shapes of the sidekeel 59 is shown here. These shapes can be, at least partially, of circular arc shape.

Figure 10:
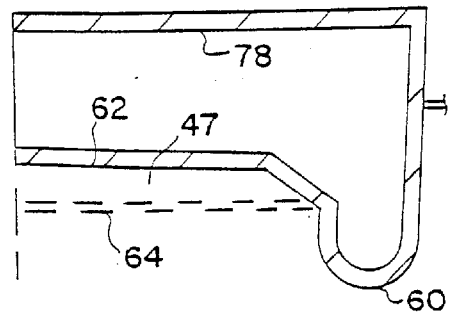
FIG. 10 gives a half-breath cross-section, as taken through line 10—10 of FIG. 2, that shows a second gas layer. Note that the second gas layer is higher than the first gas layer at these similar parts of their development.

FIG. 10 is a half-breadth cross-section, as taken through line 10—10 of FIGS. 2 and 5, that shows a similar position in way of the second gas layer aft seal 62 as was shown for the first gas layer aft seal 61 in FIG. 9. The thing to note here is the rising of the upper surfaces and of the gas layers going from forward to aft.

Figure 11:
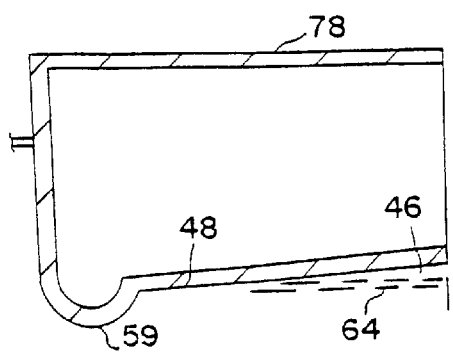
FIG. 11 is a half-breadth cross-section, as taken through line 11—11 of FIG. 2, that depicts the first gas layer in way of an aft seal restricting gas leakage from the first gas layer. Note that the aft seal is angled to horizontal over a majority of its width in this vertical transverse plane of the instant invention ALS.

FIG. 11 presents a half-breadth cross-section, as taken through line 11—11 of FIGS. 2 and 5.

Figure 12:
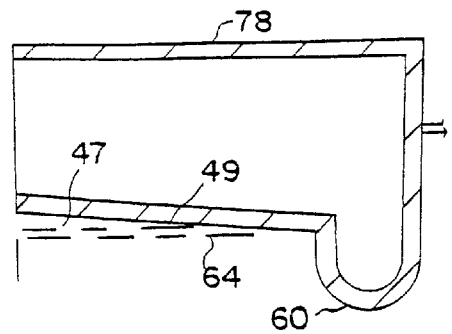
FIG. 12 is a half-breadth cross-section, as taken through line 12—12 of FIG. 2, that shows a second gas layer in way of an aft seal restricting gas leakage from said second gas layer. Note that the second gas layer is higher than the first gas layer here.

FIG. 12 presents a half-breadth cross-section, as taken through line 12—12 of FIGS. 2 and 5. Note the rising elevation of the waterline 64 going aft from FIG. 11 to FIG. 12.

FIG. 13 gives an alternative underside plan view of the inventive ALS 78 shown in profile in FIG. 1. This is the same as the underside plan view presented in FIG. 2 except there are no gas layer aft seals and a third gas layer 57 is shown and its associated third gas layer cavity 63 is introduced. It is simply presented to show that any number of gas layers may be used in accomplishing the instant invention ALS 78 and that they can be formed with or without downward extending gas layer aft seals.

In FIG. 13, a first gas layer step 71, second gas layer step 72, and third gas layer step 73 are shown. These steps, at least in part, generally define the beginning of their following gas layers.

FIG. 14 presents a centerline cross-sectional view, as taken through line 14—14 of FIG. 13, that shows the shape and formation of the three gas layers. Note that in this instance the first gas layer blower 42 also supplied pressurized gas to the second gas layer. This approach simplifies the machinery of a multiple gas layer inventive ALS 78 since it eliminates blower(s) and their drive engines. By having the blower 42 of two separate rotating elements (not shown), it is possible to supply the different pressures best suited for the first and second gas layers 46, 47. It is also possible to use a single rotating element blower to do this by having different discharge ports on that single blower for different gas layers. So, dedicated blowers can be used for each gas layer or they can be supplied from a single blower as machinery requirements dictate.

FIGS. 15, 16, and 17 show the rising of the gas layers going from forward to aft.

Figure 18:
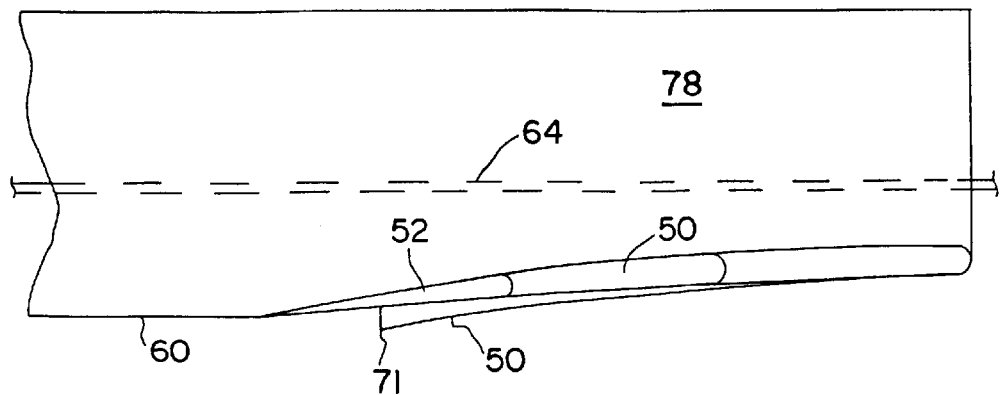
FIG. 18 presents an enlarged truncated profile view of the bow of the instant invention shown in FIGS. 1 and 4.

FIG. 18 presents a truncated profile view of the instant invention ALS 78 in the bow area that shows a hydrofoil 50. Note the depth of the first gas layer step 71 in this preferred embodiment of the instant invention.

Figure 19:
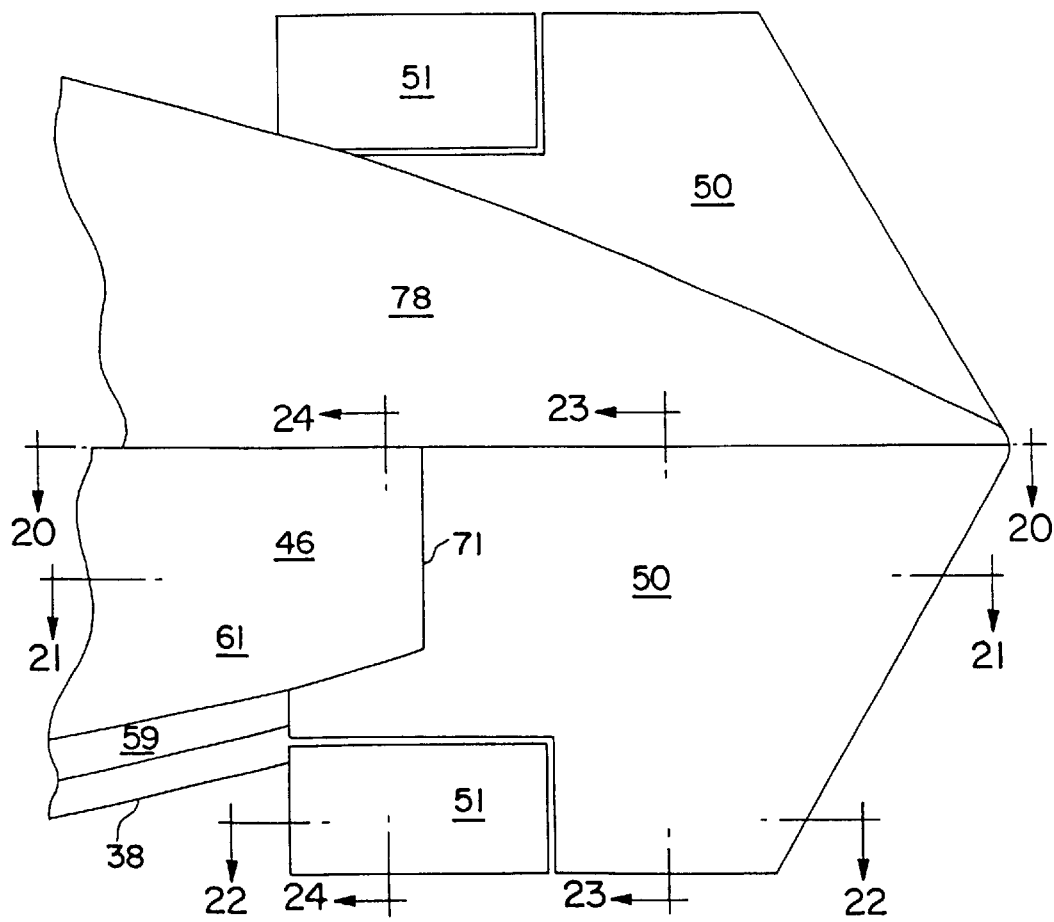
FIG. 19 presents, in its upper portion, an enlarged truncated half-breadth top plan view of the instant invention presented in FIGS. 2 and 5. The lower portion of FIG. 19 shows an enlarged truncated half-breath bottom plan view of the instant invention presented in FIGS. 2 and 5.

FIG. 19, in its upper portion, presents a half-breadth top plan view of the inventive ALS 78 given in FIG. 1. In its lower portion, it presents a half-breadth of bottom plan view.

Figure 20:
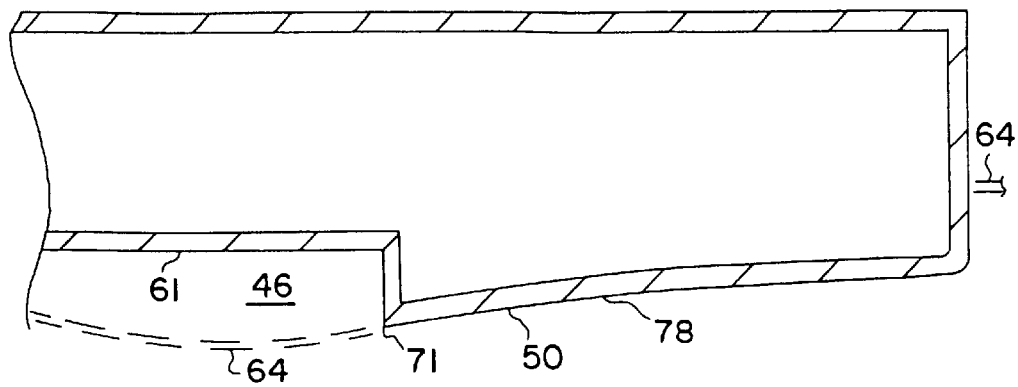
FIG. 20 is a cross-section, as taken through line 20—20 of FIG. 19, that shows a preferred shape of the underside of the hydrofoil forward of the first gas layer. Note the water directing underwater shape just forward of the first gas layer.

FIG. 20 gives a truncated centerline cross-section, as taken through line 20—20 of FIG. 19, in the area of the bow of the instant invention ALS 78. The waterline under the first gas layer 46 can be seen to curve downward initially here. That is caused by the optional but preferred downward curve of the lower surface(s) forward of the first gas layer lip 71. On average, the gas layers are angled upward going from forward to aft.

Figure 21:
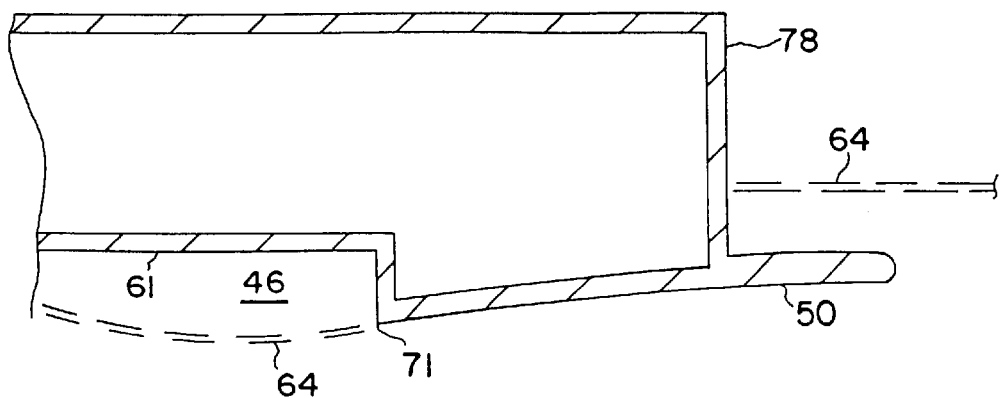
FIG. 21 gives a cross-section, as taken through line 21—21 of FIG. 19, that shows more details of the preferred hydrofoil shaping and location.

FIG. 21 is a truncated cross-section, as taken through line 21—21 of FIG. 19, that shows a preferred shaping of the hydrofoil at this section.

Figure 22:
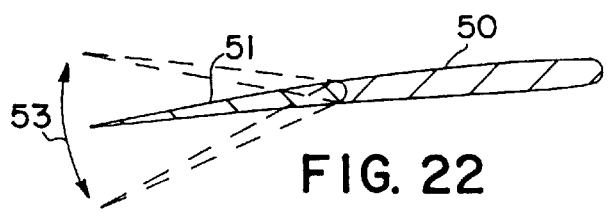
FIG. 22 is a cross-section, as taken though line 22—22 of FIG. 19, that indicates movement of an optional flap-like member at the aft end of the hydrofoil.

FIG. 22 presents a cross-section, as taken though line 22—22 of FIG. 19, that shows operation of the optional trim-flap 51. Movement of the trim-flap is indicated by the rotation arrow 53.

Figure 23:
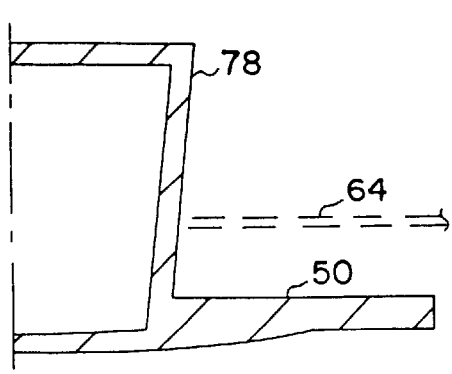
FIG. 23 is a half-breadth transverse cross-section, as taken through line 23—23 of FIG. 19, that shows a section of a hydrofoil and how it is preferably attached to the hull.

FIG. 23 gives a half-breadth cross-section, as taken through line 23—23 of FIG. 19, that shows a, at least partially, curvilinear and convex lower surface of the hydrofoil 50 in this area. The benefit of this is an improvement of the downstream positioned first gas layer lip design.

Figure 24:
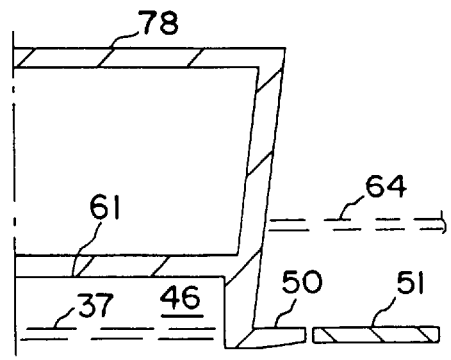
FIG. 24 gives a half-breath transverse cross-section, as taken through line 24—24 of FIG. 19, that shows on of the flap-like control members and its relationship to the hydrofoil and hull.

FIG. 24 is a half-breadth cross-section, as taken through line 24—24 of FIG. 19, that shows a flap-like trim control member 51.

FIG. 25 presents a profile view of a prior art ALS 80. Note the bulb bow and the standard underwater propeller.

FIG. 26 is a bottom plan view of the prior art ALS 80 given in FIG. 25. Note the much abbreviated length of the first gas layer 46 compared to the instant invention ALS described previously. Also note the waterline 64 on the aft end of the first gas layer cavity 61. This indicates the aspirating effect of the propeller 41 on the first gas layer 46 which has deleterious effects including: 1) A need for a more powerful blower since the gas layer is being depleted by the aspiration of gas into the propeller and 2) A reduction in propeller efficiency due to the gas entering the propeller blades. These deleterious effects are caused by having the propeller, or waterjet if used, disposed directly aft of the gas layer. Applicant's instant invention ALS avoids these problems by mounting the propulsors in the aft ends of the sidekeels.

FIG. 27 presents a centerline cross-sectional view of the prior art ALS 80 as taken through line 27—27 of FIG. 26. This shows the bulb or more correctly termed bulbous bow of the prior art ALS 80.

FIG. 28 presents a cross-section of the prior art ALS 80 taken proximal the bow as taken through a vertical transverse plane at line 28—28 of FIG. 26.

FIG. 29 is a cross-section of the prior art ALS 80 taken aft of section 28—28 as taken through a vertical transverse plane at line 29—29 of FIG. 26. Note that the hull shape is still rather curvilinear or non-flat in this section.

FIG. 30 gives a cross-section, as taken through line 30—30 of FIG. 26, that shows the necessary rather flat bottom surface that has been developed just forward of the first gas layer cavity 61 for this prior art ALS 80.

FIGS. 31 and 32 are, respectively, cross-sections taken through lines 31—31 and 32—32 of FIG. 26. They show the rising of the first gas layer 46 as it goes from fore to rear in this prior art ALS 80.

FIG. 33 presents a side profile view of an instant invention ALS 78 that is similar to that presented in FIG. 1 but with the addition of outrigger hulls—the starboard outrigger hull 67 is shown here.

A word about bow shaping for the instant invention ALS. While a vertical or plumb bow is shown, any other bow shape is possible. An interesting bow shape that should hold promise, while not shown, is one with part of a bulbous bow that joins with a hydrofoil proximal its lower surface. That approach gives the wider and flatter hydrofoil lower surface combined with the low resistance characteristics of the bulbous bow. It is to be realized that the vertical or plumb bow shown herein is, as seen in a horizontal transverse plane of the inventive ALS, at least in part airfoil shaped over its forward portions.

FIG. 34 is a top plan view of the instant invention ALS 78 showing the optional port and starboard outrigger hulls 66, 67. Optional hinges 65 are also shown. The outrigger hulls offer: 1) Extreme stability in heavy beam seas and 2) Increased deck area compared to other ALSs.

FIG. 35 gives a bow view of the instant invention ALS 78 showing the sidehulls extended. Note the shallow immersion of the outrigger hulls.

FIG. 36 presents a transverse section, as taken though line 36—36 of FIG. 33, that shows the port sidehull 66 retracted downward with part of the sidehull below the sidekeel 59 as shown here.

FIG. 37 shows a half-breadth bow view of the outrigger hull equipped inventive ALS 78. In this case it is docked, with the inboard outrigger hull retracted downward, close against a dock or pier 68. The bottom 69 next to the pier 68 is also shown.

FIG. 38 presents a multi-hull, in this case in catamaran configuration, version of the instant invention ALS 78. Here two instant invention ALS's are simply joined together by a connecting wetdeck 70. Each instant invention ALS hull here is the same as that presented in FIGS. 1 and 2 except there is only a first gas layer 46. This was done for illustrative purposes as any number of gas layers may be incorporated into the instant invention ALS. It is to be realized that, although a twin hull or catamaran configuration is here used for illustration that any number of inventive ALS hulls can be used together in a multi-hull ALS arrangement.

FIG. 39 presents a cross-sectional view, as taken through line 39—39 of FIG. 38, that shows development of the single first gas layer 46 in this case.

FIG. 40 gives a cross-sectional view, as taken through line 40—40 of FIG. 38, that shows the connecting deck or wetdeck 70.

Location of the propulsors in the preferred embodiment of the instant invention is to be noted with some words here. When waterjets are used, their preferred location is as shown in FIGS. 1, 2, 3, 7, 38, 39, and 40. When propellers are used, their preferred location is as shown in FIGS. 4, 5, and 8. In each of these preferred locations the propulsors are installed, either all or in part, in aft extensions to the sidehulls. This locating of the propulsors provides the best air or gas free water to their rotors, little or no aspiration of gas from the gas layers, and little distortion of inlet water to the propulsors. It is also important that the sidekeels, when they develop into the extensions just forward of the propulsors, be curvilinear in shape externally. The actual best shape includes circular arc shapes at least over a majority of a lower half of the sidekeel extension(s).

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an improved air lubricated ship, the improvement comprising:

a hydrofoil member disposed proximal a forward bow portion of said improved air lubricated ship, a first pressurized gas layer with a forward portion of said first pressurized gas layer disposed, at least in its majority, aft of a first step in an underside of said improved air lubricated ship when said improved air lubricated ship is moving forward and including a first artificial gas pressurization means to supply pressurized gas to said first pressurized gas layer and where said first pressurized gas layer, on average, slopes upward going from forward to aft and wherein said hydrofoil member emanates from either side of a lower part of the forward bow portion thereby forming a wide underside base as compared to bow sections proximal to and above the hydrofoil, a second step in the underside of said air lubricated ship wherein said second step is disposed, at least in its majority, proximal an aft end of said first pressurized gas layer and wherein a second pressurized gas layer is disposed, at least in its majority, aft of said second step and where said second pressurized gas layer, on average, slopes upward going from forward to aft and is bordered over at least a majority of its length by said sidekeels, and which further comprises a downward extending gas restraining seal positioned proximal an aft end of said second gas layer.

2. The improved air lubricated ship of claim 1 wherein a forward portion of said first pressurized gas layer is disposed, at least in its majority, proximal an underside of said hydrofoil when said improved air lubricated ship is moving forward.

3. The improved air lubricated ship of claim 2 wherein said first step in an underside of said improved air lubricated ship is at least partially disposed in an underside of the hydrofoil.

4. The improved air lubricated ship of claim 1 wherein a lower surface proximal to and forward of said first step is turned downward to direct water flow downward when the improved air lubricated ship is moving forward.

5. The improved air lubricated ship of claim 1 wherein said hydrofoil includes hydrofoil trim control members that aid in controlling pitch and roll of said improved air lubricated ship.

6. The improved air lubricated ship of claim 1 wherein an underwater section of the improved air lubricated ship's hull, as seen in a horizontal plane taken above the hydrofoil when the improved air lubricated ship is moving forward, is at least partially airfoil shaped over its forward portions.

7. The improved air lubricated ship of claim 1 wherein an underwater section of the improved air lubricated ship's bow positioned above the hydrofoil is at least in part bulbous shaped.

8. The improved air lubricated ship of claim 1 wherein a lowermost submerged portion proximal a bow of said improved air lubricated ship is within twenty percent of the submerged depth of a lowermost portion proximal of an aft portion of said improved air lubricated ship when the improved air lubricated ship is moving forward in a calm sea.

9. The improved air lubricated ship of claim 1 wherein a lowermost submerged portion proximal a bow of said improved air lubricated ship is within twenty-five percent of the submerged depth of a lowermost portion proximal of an aft portion of said improved air lubricated ship when the improved air lubricated ship is moving forward in a calm sea.

10. The improved air lubricated ship of claim 1 wherein a lowermost submerged portion proximal a bow of said improved air lubricated ship is within thirty percent of the submerged depth of a lowermost portion proximal of an aft portion of said improved air lubricated ship when the improved air lubricated ship is moving forward in a calm sea.

11. The improved air lubricated ship of claim 1 wherein said first step is disposed, at least in its majority, in a forward fifteen percent of a length of said improved air lubricated ship.

12. The improved air lubricated ship of claim 1 wherein said first step is disposed, at least in its majority, in a forward twenty percent of a length of said improved air lubricated ship.

13. The improved air lubricated ship of claim 1 wherein said first step is disposed, at least in its majority, in a forward twenty-five percent of a length of said improved air lubricated ship.

14. The improved air lubricated ship of claim 1 wherein said first step is disposed, at least in its majority, in a forward thirty percent of a length of said improved air lubricated ship.

15. The improved air lubricated ship of claim 1 wherein said first gas layer is bordered over at least a majority of its length by sidekeels.

16. The improved air lubricated ship of claim 1 which further comprises a third step in the underside of the air lubricated ship wherein said third step is disposed, at least in its majority, proximal an aft end of said second pressurized gas layer and where a third pressurized gas layer is disposed, at least in its majority, aft of said third step and wherein said third pressurized gas layer, on average, slopes upward going from forward to aft and is bordered over at least a majority of its length by said sidekeels.

17. The improved air lubricated ship of claim 16 wherein the third gas layer receives pressurized gas from an artificial gas pressurization means.

18. The improved air lubricated ship of claim 16 which further comprises a third downward extending gas restraining seal positioned proximal an aft end of said third gas layer.

19. The improved air lubricated ship of claim 16 wherein said third downward extending gas restraining seal, as seen in a vertical transverse plane of the improved air lubricated ship, is angled to horizontal over a majority of its width.

20. The improved air lubricated ship of claim 1 wherein the second gas layer receives pressurized gas from the first artificial gas pressurization means.

21. The improved air lubricated ship of claim 1 wherein the second gas layer receives pressurized gas from a second artificial gas pressurization means.

22. The improved air lubricated ship of claim 1 which further comprises a first downward extending gas restraining seal positioned proximal an aft end of said first gas layer.

23. The improved air lubricated ship of claim 22 wherein said first downward extending gas restraining seal, as seen in a vertical transverse plane of the improved air lubricated ship, is angled to horizontal over a majority of its width.

24. The improved air lubricated ship of claim 1 wherein said second downward extending gas restraining seal, as seen in a vertical transverse plane of the improved air lubricated ship, is angled to horizontal over a majority of its width.

25. The improved air lubricated ship of claim 1 which further comprises outrigger hulls disposed either side of a main hull of said air lubricated ship.

26. The improved air lubricated ship of claim 25 wherein said outrigger hulls are retractable.

27. The improved air lubricated ship of claim 26 wherein said outrigger hulls are retractable downward such that a portion of at least one of the outrigger hulls is disposed below one of the sidekeels of said improved air lubricated ship.

28. The improved air lubricated ship of claim 1 wherein propulsors are disposed proximal an aft end of said sidekeels.

29. The improved air lubricated ship of claim 28 wherein said propulsors are waterjets that take in inlet water from a portion of a periphery of said sidekeels.

30. The improved air lubricated ship of claim 29 which further comprises one or more air fences disposed above and proximal to water inlets of said waterjets whereby said air fences restrict air from flowing downward into the waterjet's water inlets.

31. The improved air lubricated ship of claim 28 wherein said propulsors are propellers with said propellers rotating, as seen in an aft view of the improved air lubricated ship, with an upper blade rotating in an outboard direction to thereby aid in restricting gas leakage from an aft gas layer by building up a pressure front of water over an aft end of said aft gas layer.

32. The improved air lubricated ship of claim 28 wherein an external portion of the sidekeels proximal the propulsors is, at least in their majority, curvilinear.

33. The improved air lubricated ship of claim 1 wherein there are multiple air lubricated hulls in mechanical communication by means of a connecting structure.

34. In an improved air lubricated ship including a first pressurized gas layer disposed, at least in its majority, aft of a first step in an underside of said air lubricated ship when said air lubricated ship is moving forward and including a first artificial gas pressurization means to supply pressurized gas to said first pressurized gas layer and where said first pressurized gas layer, on average, slopes upward going from forward to aft and is bordered over at least a majority of its length by sidekeels, the improvement comprising:

a second step in the underside of the air lubricated ship wherein said second step is disposed, at least in its majority, proximal an aft end of said first pressurized gas layer and wherein a second pressurized gas layer is disposed, at least in its majority, aft of said second step and where said second pressurized gas layer, on average, slopes upward going from forward to aft and is bordered over at least a majority of its length said sidekeels.

35. The improved air lubricated ship of claim 34 wherein a lower surface proximal to and forward of said first step is turned downward to direct water flow downward when the improved air lubricated ship is moving forward.

36. The improved air lubricated ship of claim 34 wherein the second gas layer receives pressurized gas from the first artificial gas pressurization means.

37. The improved air lubricated ship of claim 34 wherein the second gas layer received pressurized gas from a second artificial gas pressurization means.

38. The improved air lubricated ship of claim 34 wherein the third gas layer receives pressurized gas from an artificial gas pressurization means.

39. The improved air lubricated ship of claim 34 which further comprises a hydrofoil member disposed proximal a forward portion of said air lubricated ship.

40. The improved air lubricated ship of claim 39 wherein a forward portion of said first pressurized gas layer is disposed, at least in its majority, proximal an underside of said hydrofoil when said improved air lubricated ship is moving forward.

41. The improved air lubricated ship of claim 39 wherein an underwater section of the improved air lubricated ship's hull, as seen in a horizontal plane taken above the hydrofoil when the improved air lubricated ship is moving forward, is at least partially airfoil shaped over its forward portions.

42. The improved air lubricated ship of claim 39 wherein an underwater section of the improved air lubricated ship's bow positioned above the hydrofoil is at least in part bulbous shaped.

43. The improved air lubricated ship of claim 39 wherein said hydrofoil includes hydrofoil trim control members that aid in controlling pitch and roll of said air lubricated ship.

44. The improved air lubricated ship of claim 34 which further comprises a first downward extending gas restraining seal positioned proximal an aft end of said first gas layer.

45. The improved air lubricated ship of claim 44 wherein said first downward extending gas restraining seal, as seen in a vertical transverse plane of the improved air lubricated ship, is angled to horizontal over a majority of its width.

46. The improved air lubricated ship of claim 34 which further comprises a second downward extending gas restraining seal positioned proximal an aft end of said second gas layer.

47. The improved air lubricated ship of claim 46 wherein said second downward extending gas restraining seal, as seen in a vertical transverse plane of the improved air lubricated ship, is angled to horizontal over a majority of its width.

48. The improved air lubricated ship of claim 34 which further comprises a third downward extending gas restraining seal positioned proximal an aft end of said third gas layer.

49. The improved air lubricated ship of claim 48 wherein said third downward extending gas restraining seal, as seen in a vertical transverse plane of the improved air lubricated ship, is angled to horizontal over a majority of its width.

50. The improved air lubricated ship of claim 34 wherein a lowermost submerged portion proximal a bow of said improved air lubricated ship is within twenty percent of the submerged depth of a lowermost portion proximal of an aft portion of said improved air lubricated ship when the improved air lubricated ship is moving forward in a calm sea.

51. The improved air lubricated ship of claim 34 wherein a lowermost submerged portion proximal a bow of said improved air lubricated ship is within twenty-five percent of the submerged depth of a lowermost portion proximal of an aft portion of said improved air lubricated ship when the improved air lubricated ship is moving forward in a calm sea.

52. The improved air lubricated ship of claim 34 wherein a lowermost submerged portion proximal a bow of said improved air lubricated ship is within thirty percent of the submerged depth of a lowermost portion proximal of an aft portion of said improved air lubricated ship when the improved air lubricated ship is moving forward in a calm sea.

53. The improved air lubricated ship of claim 34 wherein said first step is disposed, at least in its majority, in a forward fifteen percent of a length of said improved air lubricated ship.

54. The improved air lubricated ship of claim 34 wherein said first step is disposed, at least in its majority, in a forward twenty percent of a length of said improved air lubricated ship.

55. The improved air lubricated ship of claim 34 wherein said first step is disposed, at least in its majority, in a forward twenty-five percent of a length of said improved air lubricated ship.

56. The improved air lubricated ship of claim 34 wherein said first step is disposed, at least in its majority, in a forward thirty percent of a length of said improved air lubricated ship.

57. The improved air lubricated ship of claim 34 which further comprises outrigger hulls disposed either side of a main hull of said air lubricated ship.

58. The improved air lubricated ship of claim 57 wherein said outrigger hulls are retractable.

59. The improved air lubricated ship of claim 58 wherein said outrigger hulls are retractable downward such that a portion of at least one of the outrigger hulls is disposed below one of the sidekeels of said improved air lubricated ship.

60. The improved air lubricated ship of claim 34 wherein propulsors are disposed proximal an aft end of said sidekeels.

61. The improved air lubricated ship of claim 60 wherein said propulsors are waterjets that take in inlet water from a portion of a periphery of said sidekeels.

62. The improved air lubricated ship of claim 61 which further comprises one or more air fences disposed above and proximal to water inlets of said waterjets whereby said air fences restrict air from flowing downward into the waterjet's water inlets.

63. The improved air lubricated ship of claim 60 wherein said propulsors are propellers with said propellers rotating, as seen in an aft view of the improved air lubricated ship, with an upper blade rotating in an outboard direction to thereby aid in restricting gas leakage from an aft gas layer by building up a pressure front of water over an aft end of said aft gas layer.

64. The improved air lubricated ship of claim 60 wherein an external portion of the sidekeels proximal the propulsors is, at least in their majority, curvilinear.

65. The improved air lubricated ship of claim 34 wherein there are multiple air lubricated hulls in mechanical communication by means of a connecting structure.

66. In an improved air lubricated ship, the improvement comprising:
    a hydrofoil member disposed proximal a forward portion of said improved air lubricated ship, a first pressurized gas layer with a forward portion of said first pressurized gas layer disposed, at least in part, in an underside of said hydrofoil when said improved air lubricated ship is moving forward and including a first artificial gas pressurization means to supply pressurized gas to said first pressurized gas layer, a second pressurized gas layer disposed, at least in its majority, aft of a second step, and a third pressurized gas layer disposed, at least in its majority, aft of a third step.

67. The improved air lubricated ship of claim 66 wherein said first pressurized gas layer, on average, slopes upward going from forward to aft.

68. The improved air lubricated ship of claim 66 which further includes a first step proximal a forward end of said first pressurized gas layer.

69. The improved air lubricated ship of claim 68 wherein said first step is at least partially disposed in an underside of the hydrofoil.

* * * * *